United States Patent
Namuduri et al.

(10) Patent No.: US 8,314,578 B2
(45) Date of Patent: Nov. 20, 2012

(54) CONTROL OF AN ALTERNATOR-STARTER FOR A HYBRID ELECTRIC VEHICLE HAVING A DISCONNECTED HIGH-VOLTAGE BATTERY

(75) Inventors: Chandra S. Namuduri, Troy, MI (US); Bryan M. Ludwig, West Bloomfield, MI (US); Keith D. Van Maanen, Birmingham, MI (US); Suresh Gopalakrishnan, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 12/710,424

(22) Filed: Feb. 23, 2010

(65) Prior Publication Data
US 2010/0225258 A1 Sep. 9, 2010

Related U.S. Application Data

(60) Provisional application No. 61/158,740, filed on Mar. 9, 2009.

(51) Int. Cl.
*H02P 27/06* (2006.01)

(52) U.S. Cl. ................. 318/400.3; 318/400.01; 318/700

(58) Field of Classification Search ............... 318/400.3, 318/400.01, 700
See application file for complete search history.

(56) References Cited

U.S. PATENT DOCUMENTS

| 5,373,195 | A | * | 12/1994 | De Doncker et al. | ........... 307/45 |
| 5,552,980 | A | * | 9/1996 | Garces et al. | ................... 363/98 |
| 5,896,283 | A | * | 4/1999 | Usami | ............................. 363/98 |
| 5,963,442 | A | * | 10/1999 | Yoshida et al. | ................. 363/98 |
| 6,275,093 | B1 | | 8/2001 | Shehawat et al. | |
| 6,335,574 | B1 | * | 1/2002 | Ochiai et al. | ................ 290/40 C |

OTHER PUBLICATIONS

U.S. Appl. No. 12/407,143, filed Mar. 19, 2009, Van Maanen, Keith.

* cited by examiner

*Primary Examiner* — Walter Benson
*Assistant Examiner* — David Luo

(57) ABSTRACT

A hybrid powertrain system includes an electric motor/generator unit having a multiphase asynchronous AC machine electrically connected to a multiphase bridge inverter. A high-voltage capacitor is electrically connected between positive and negative sides of a high-voltage DC power bus. High-voltage DC bus pre-charge circuits are electrically connected between gate drive bias power supplies and the multiphase bridge inverter. A low-voltage battery electrically charges the high-voltage DC link capacitor via the gate drive bias power supplies and the high-voltage DC bus pre-charge circuits when the high-voltage energy storage system is disconnected from the high-voltage DC power bus.

17 Claims, 2 Drawing Sheets

CONTROL OF AN ALTERNATOR-STARTER FOR A HYBRID ELECTRIC VEHICLE HAVING A DISCONNECTED HIGH-VOLTAGE BATTERY

CROSS REFERENCE TO RELATED APPLICATIONS

This application claims the benefit of U.S. Provisional Application No. 61/158,740, filed on Mar. 9, 2009, which is incorporated herein by reference.

TECHNICAL FIELD

This disclosure relates to electrical power flow in a hybrid electric vehicle, and more particularly to auxiliary power generation when a high-voltage battery is disconnected.

BACKGROUND

The statements in this section merely provide background information related to the present disclosure and may not constitute prior art.

Hybrid electric vehicles can selectively use different energy sources as needed in order to achieve optimal fuel efficiency. A vehicle can selectively use either or both an internal combustion engine and a motor/generator unit(s) connected to a high-voltage battery module or energy storage system for propulsion and operational control.

One vehicle includes a hybrid powertrain including an engine stop/start system wherein the engine automatically shuts down during ongoing vehicle operation and automatically restarts using an electric motor/generator unit. The system preferably includes a regenerative braking system for recharging the high-voltage energy storage system via the electric motor/generator unit and the ability to selectively shut down the engine during vehicle idle, referred to as an Auto Stop control scheme.

The motor/generator unit can be used as a belt-alternator-starter (BAS) system in place of an alternator. The BAS applies torque to a serpentine belt of the engine when an operator signals an intention to resume travel after executing an Auto Stop control scheme. Torque from the motor/generator unit(s) can spin the engine for a short duration to crank the engine until it fires and runs. During cold starting of the engine, a crankshaft-mounted auxiliary or 12-volt starter motor can provide cranking torque to crank and start the engine. Known BAS systems use a high-voltage energy storage system supplying high-voltage electrical power through a voltage inverter to the motor/generator unit(s). The high-voltage battery can be temporarily disconnected or otherwise rendered unavailable due to a fault or other operating conditions. This may result in a loss of or an insufficient field excitation, especially for an asynchronous machine-based electric motor/generator unit, which in turn can result in a loss of sustained auxiliary electrical power generation aboard the vehicle. Insufficient auxiliary electrical power can result in a vehicle shutdown leading to a walk-home event.

SUMMARY

An electric circuit for a hybrid powertrain system includes a multiphase bridge inverter electrically connected to a high-voltage energy storage system via positive and negative sides of a high-voltage DC power bus. A multiphase asynchronous AC machine is electrically connected to the multiphase bridge inverter, and a high-voltage DC link capacitor is electrically connected between the positive and negative sides of the high-voltage DC power bus. A low-voltage battery is electrically connected to a gate drive bias power supply, and a gate drive pre-charge circuit is electrically connected between the gate drive bias power supply and the multiphase bridge inverter. The low-voltage battery electrically charges the high-voltage DC link capacitor via the gate drive bias power supply and the gate drive pre-charge circuit when the high-voltage energy storage system is disconnected from the high-voltage DC power bus.

BRIEF DESCRIPTION OF THE DRAWINGS

One or more embodiments will now be described, by way of example, with reference to the accompanying drawings, in which.

DETAILED DESCRIPTION

Figure 1:
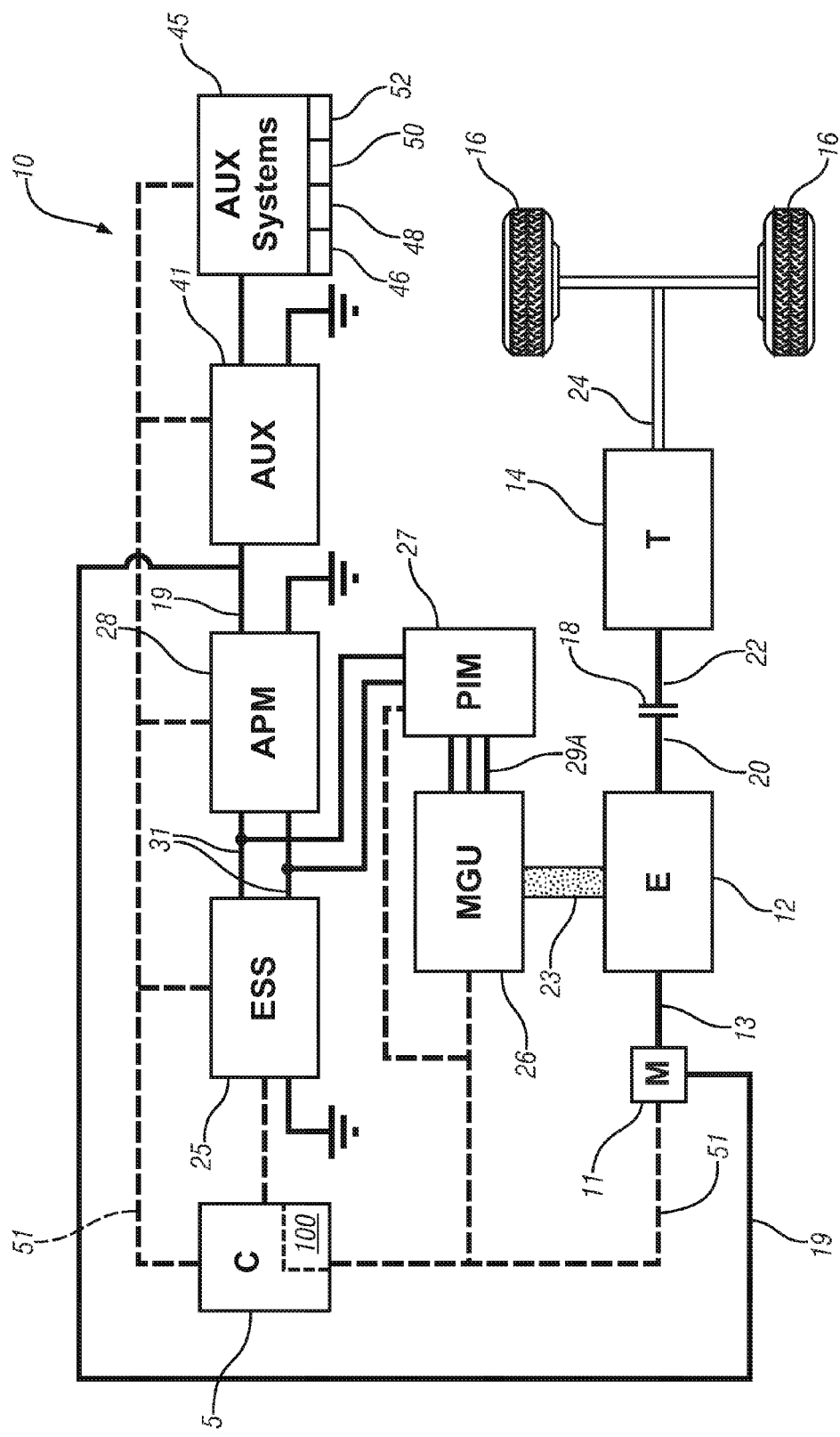
FIG. 1 is a schematic illustration of a fuel-electric hybrid vehicle including an internal combustion engine rotatably coupled to an electric motor/generator unit and a transmission in accordance with the present disclosure.

Referring now to the drawings, wherein the showings are for the purpose of illustrating certain exemplary embodiments only and not for the purpose of limiting the same, FIG. 1 schematically illustrates a propulsion system for a fuel-electric hybrid vehicle 10. As configured, the fuel-electric hybrid vehicle 10 includes an internal combustion engine (E) 12 rotatably coupled to an electric motor/generator unit (MGU) 26 and a transmission (T) 14. The transmission 14 is configured to transfer tractive torque to road wheels 16 in response to control signals originating from a control module (C) 5. Like reference numerals correspond to like or similar components in the several drawings.

The internal combustion engine 12 is mechanically rotatably coupled to the electric motor/generator unit 26 via a drive system 23 including a serpentine belt or another suitable coupling mechanism. In one embodiment, the drive system 23 includes the serpentine belt routed between a pulley attached to a crankshaft 13 of the engine 12 and another pulley attached to a rotating shaft coupled to a rotor of the electric motor/generator unit 26. The aforementioned elements form a belt-alternator-starter (BAS) system. The engine 12 includes an auxiliary starter motor (M) 11 that can be selectively connected through a gear set to the crankshaft 13 of the engine 12, and is configured to provide cranking torque to crank the engine 12 in response to a start command associated with an operator key-on command The crankshaft 13 of the engine 12 is coupled to a rotatable output member 20 coupled to an input member 22 of the transmission 14. In one embodiment, the output member 20 of the engine 12 couples to the input member 22 of the transmission 14 via a torque transfer mechanism 18, which can include a clutch device, a hydrodynamic torque converter, or another suitable mechanism. The transmission 14 can be a multi-speed step transmission, an electrically-variable transmission, or any other suitable transmission design capable of transferring tractive torque between the transmission 14 and road wheels 16 via an output member 24.

Preferably, the engine 12 is a multi-cylinder internal combustion engine selectively operative in a plurality of states during ongoing operation of the vehicle 10, including one of an engine-on state and an engine-off state. The engine-on and engine-off states are achieved using an Auto-Start control scheme and an Auto-Stop control scheme, respectively. During ongoing operation of the vehicle 10, the control module 5 can control the engine 12 to the engine-off state using the Auto-Stop control scheme in response to operator commands, e.g., no depression of an accelerator pedal and vehicle operating conditions that include an engine idle that may occur in response to a vehicle stop condition at a traffic light. It is appreciated that other operating conditions may result in the engine 12 operating at idle. In this manner, the vehicle 10 is able to reduce fuel consumption. Subsequently, the control module 5 can control the engine 12 to the engine-on state using the Auto-Start control scheme to provide tractive torque for vehicle propulsion in response to an operator command, e.g., depression of an accelerator pedal. An engine-on state is an engine operating state whereat the engine 12 is fueled and fired and is producing sufficient torque to maintain engine operation at or above a combustion stability limit, and an engine-off state is an engine operating state whereat the engine 12 is unfueled and unfired and not generating torque. Other engine states can include one of an all-cylinder state and a cylinder deactivation state, and one of a fueled state and a fuel cutoff state. In one embodiment, the engine 12 is a spark-ignition engine with timing of combustion controlled by advancing or retarding spark ignition timing. Alternatively, the engine 12 is a compression-ignition engine with timing of combustion controlled by advancing or retarding timing of fuel injection events. It is appreciated that the engine 12 can be configured to operate in other combustion modes.

The electric motor/generator unit 26 preferably includes a multiphase induction or asynchronous AC machine including a stator and a rotor magnetically coupled to the stator. As depicted, the electric motor/generator unit 26 is a three-phase machine. It is appreciated that the electric motor/generator unit 26 can include any one of a plurality of multiphase devices, e.g., two-phase, four-phase, five-phase, and six-phase electric machines. The rotor of the electric motor/generator unit 26 is preferably coupled to the belt drive system 23, which is configured to transfer torque between the electric motor/generator unit 26 and the engine 12.

A power inverter module (PIM) 27 electrically connects to a high-voltage energy storage system (ESS) 25 via a high-voltage DC power bus 31, which includes a positive high-voltage DC power bus 31A and a negative high-voltage DC power bus 31B as illustrated with reference to FIG. 2. A high-voltage switch 40 is positioned in such a way as to disconnect the energy storage system 25 from one or both the positive and negative sides of the high-voltage DC power bus 31A and 31B, e.g., in response to a system fault. The high-voltage switch 40 is illustrated in an open position, but is in a closed position during ongoing operation. The power inverter module 27 and associated control circuits and schemes can convert direct current (DC) electric power originating from the high-voltage energy storage system 25 to alternating current (AC) electric power which is transferred to the electric motor/generator unit 26 to generate torque. The power inverter module 27 and associated control circuits and schemes can convert AC electric power originating in the electric motor/generator unit 26 to DC electric power to electrically charge the high-voltage energy storage system 25 when magnetizing current sufficiently magnetizes the stator.

An auxiliary power module (APM) 28 is electrically connected to the high-voltage energy storage system 25, with the electrical connection described with reference to FIG. 2. The auxiliary power module 28 is also electrically connected to an auxiliary battery (AUX) 41 via a low-voltage (LV) DC power bus 19. The auxiliary battery 41 is preferably a low-voltage energy storage device, such as a 12V DC battery, and is suitable for powering the starter motor 11 and other accessories and auxiliary systems (AUX systems) 45 aboard the vehicle 10, including, e.g., headlights and interior lights 46, a radio or audio system 48, power seats 50, and an electric power steering (EPS) system 52. The auxiliary power module 28 may be configured as a DC-DC power converter that converts DC electric power from a high-voltage level to a low-voltage level, and vice versa, the operation of which is controlled by the control module 5. The auxiliary power module 28 is preferably configured as a DC-DC power converter that only converts DC electric power from a high-voltage level to a low-voltage level to minimize cost. That is, the auxiliary power module 28 converts power at high voltage originating in the high-voltage energy storage system 25 to low voltage power suitable for charging the auxiliary battery 41 and/or directly powering one or more of the auxiliary systems 45 as needed. The control module 5 controls power flow aboard the vehicle 10 from the high-voltage energy storage system 25 and auxiliary battery 41 to provide the required electrical functionality.

High-voltage as used herein is understood to mean nominal voltage levels used primarily in propulsion applications for the vehicle (e.g. for high-voltage electric machines). Low-voltage as used herein is understood to mean nominal voltage levels used primarily in low voltage accessory loads for the vehicle (e.g. for high-voltage electric machines). More generally, as used herein, high-voltage and low-voltage are understood to mean nominal voltage levels relative to each other.

The control module 5 can be configured as a distributed or a central control module having such controllers and capabilities as necessary to execute all required power flow control functionality aboard the vehicle 10 in a desired manner. Control module, module, controller, processor and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event. The control module 5 has a set of executable control schemes 100, including algorithms in the form of resident program instructions and calibrations stored in one of the storage mediums and executed to provide the respective functions.

The control module 5 is signally and operatively connected to each of the engine 12, the starter motor 11, the electric motor/generator unit 26, the high-voltage energy storage system 25, the auxiliary power module 28, the power inverter module 27, and the auxiliary battery 41 preferably via a communications bus 51, as shown. It is appreciated that information transfer to and from the control module 5 can be accomplished by one or more communications paths, including using a direct connection, using a local area network bus and using a serial peripheral interface bus.

When the engine 12 includes the electric motor/generator unit 26 and is configured as a belt-alternator-starter (BAS) system as described above, the power inverter module 27 can selectively control the electric motor/generator unit 26 to rotate the belt drive system 23 to crank the engine 12, e.g., after an Auto-Stop control scheme. Furthermore, the power inverter module 27 can selectively control the electric motor/generator unit 26 to operate as a generator to recharge the high-voltage energy storage system 25 via power transfer from the engine 12 and the transmission 14. This can include, for example, capturing energy transferred from the wheels 16 through the transmission 14 and the engine 12 to the electric motor/generator unit 26 during a regenerative braking event. The starter motor 11 can be controlled to draw electrical power from the low-voltage auxiliary battery (AUX) 41 for cranking and starting the engine 12 as needed, such as during an initial start-up of the vehicle 10 in response to a key-on event and in response to high-voltage electrical fault condition as described hereinbelow.

Figure 2:
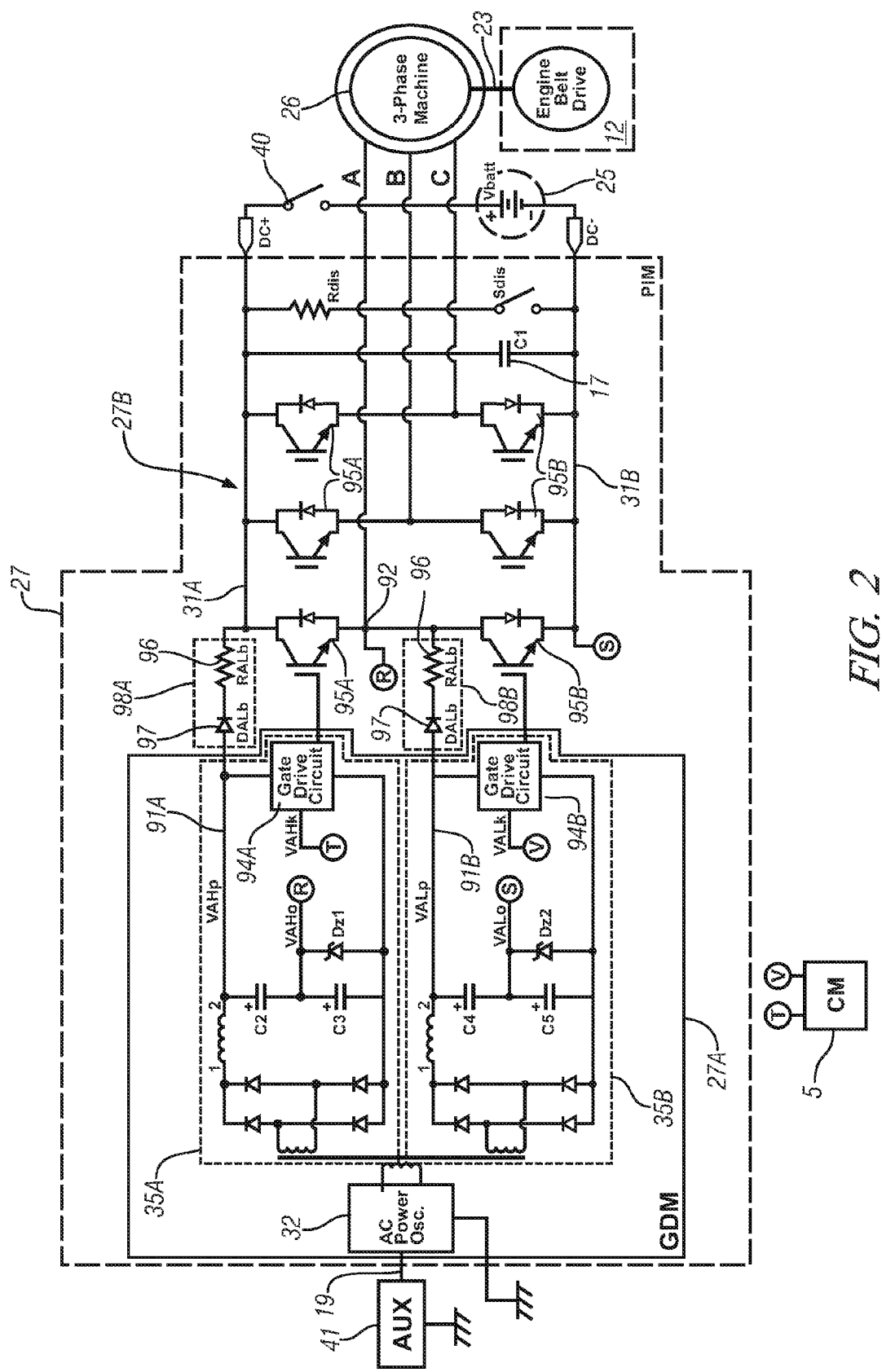
FIG. 2 schematically shows details of an electrical circuit associated with a vehicle including the auxiliary battery, the auxiliary power module, the power inverter module, and the electric motor/generator unit coupled to the engine via a belt drive system in accordance with the present disclosure.

FIG. 2 schematically shows details of an electrical circuit associated with the vehicle 10 of FIG. 1 including the auxiliary battery (AUX) 41, the power inverter module (PIM) 27 including a gate drive module (GDM) 27A, and the electric motor/generator unit 26 coupled to the engine 12 via the belt drive system 23. The gate drive module 27a includes an AC power oscillator 32 electrically connected to the auxiliary battery 41 via the LV bus 19. The AC power oscillator 32 electrically connects to upper and lower gate drive bias power supplies 35A and 35B, respectively that provide DC electric power to gate drive circuits 94A and 94B, respectively. Power inverter module (PIM) 27 includes multi-phase bridge converter 27B including controlled switch devices 95 arranged in phase pairs and controlled through individual switching to convert DC voltage between the positive and negative sides of the high-voltage DC power bus 31A and 31B to AC voltage for operating the electric motor/generator unit (MGU) 26 in a motoring mode, or to convert AC voltage from the electric motor/generator unit (MGU) 26 operating in a generating mode to DC voltage between the positive and negative sides of the high-voltage DC power bus 31A and 31B to restore energy to the high-voltage energy storage system (ESS) 25.

A signal output from each of the gate drive circuits 94A and 94B electrically connects to a base of one of switch devices 95A and 95B, respectively, of the bridge converter 27B. A pair of the gate drive circuits 94A and 94B and an associated pair of the switch devices 95A and 95B corresponding to a single phase (A) of the electric motor/generator unit 26 are shown. During ongoing operation, each gate drive circuit 94 associated with one of the switch devices 95 generates a pulse in response to a control signal originating from the control module 5, which activates the switch device 95 and induces current flow through one of the phases of the electric motor/generator unit 26. It is appreciated that there is a gate drive module 27A including an upper and lower gate drive bias power supply 35A and 35B and corresponding switching devices 95A and 95B for the bridge converter 27B associated with each phase of the electric motor/generator unit 26. It is appreciated that there is a gate drive circuit 94 associated with each switch device 95.

The bridge converter 27B electrically connects to each phase of the electric motor/generator unit 26. The bridge converter 27B includes a plurality of the switch devices 95, shown as three pairs of the switch devices 95A and 95B associated with corresponding phases of the electric motor/generator unit 26. Each switch device 95 corresponds to one of the gate drive circuits 94 of the gate drive module 27A.

The electric motor/generator unit 26 is electrically connected to the bridge converter 27B as shown, and mechanically coupled to the engine 12 via the belt drive system 23. One or more high-voltage DC link capacitor(s) 17 is positioned across the positive and negative sides of the high-voltage DC power bus 31A and 31B. In one embodiment the DC link capacitor(s) 17 have a 3000 µF capacitance.

The high-voltage energy storage system 25 electrically connects to the positive and negative sides of the high-voltage DC power bus 31A and 31B, respectively, with the high-voltage switch 40 positioned in such a way as to disconnect the high-voltage energy storage system 25 from one or both the positive and negative sides of the high-voltage DC power bus 31A and 31B.

Each switch device 95 preferably includes a semi-conductor device having low-on impedance, e.g., in an order of magnitude of milli-Ohms. One exemplary switch device includes a field-effect transistor device. In one embodiment this can be a MOSFET device. Alternatively, the switch devices 95 can include IGBT devices, JFET devices and other devices. The switch devices 95 are configured as pairs, designated as 95A and 95B, to control electric power flow between the positive side of the high-voltage bus 31A and one of the plurality of electric cables connected to and associated with one of the phases of the electric motor/generator unit 26 and the negative side of the high-voltage bus 31B. The control module 5 includes a switch control circuit to control activation and deactivation of each of the switch devices 95 via the gate drive circuits 94.

Gate drive pre-charge circuits 98 are serially connected between the gate drive module 27A and the high-voltage bus 31A of the bridge converter 27B. More specifically, each phase of the bridge converter 27B includes a first one of the gate drive pre-charge circuits 98A serially connected between a high-voltage side 91A of the upper gate drive bias power supply 35A and the positive side of the high-voltage bus 31A, and a second one of the gate drive pre-charge circuits 98B serially connected between a high-voltage side 91B of the lower gate drive bias power supply 35B and an electric node 92 defined by a junction point between the associated pair of the switch devices 95A and 95B that electrically connects to one phase of the electric motor/generator unit 26.

Each gate drive pre-charge circuit 98 includes a diode 97 connected in series to a resistive device 96. The diode 97 is preferably biased to permit current flow from the high-voltage bus 31A to the bridge converter 27B and restrict current flow from the bridge converter 27B to the gate drive module 27A.

When a fault is detected in the high-voltage circuit, e.g., a ground isolation fault, the high-voltage switch 40 is controlled to disconnect the high-voltage energy storage system 25 from one or both the positive and negative sides of the high-voltage DC power bus 31A and 31B. The control module 5 discontinues activating and deactivating all the switch devices 95 via the gate drive circuits 94. The gate drive pre-charge circuits 98 are configured to permit the gate drive module 27A to use electric power originating from the auxiliary battery 41 to electrically charge the DC link capacitor(s) 17. Thus, when the high-voltage energy storage system 25 is disconnected from the charging circuit by opening of the high-voltage switch 40, the gate drive pre-charge circuits 98 function to charge the DC link capacitor(s) 17 using low-voltage electric power originating from the auxiliary battery 41. In one embodiment, when the auxiliary battery 41 is a nominal 12 V DC device, each of the upper and lower gate drive bias power supplies 35A and 35B can generate a voltage output applied to the pre-charge circuits 98 that may range between 15V and 25V. When the pre-charge circuits 98 are connected to the bridge converter 27B as described hereinabove and the high-voltage switch 40 is open, thus removing the high-voltage energy storage system 25 from the circuit, electric power passes through the pre-charge circuits 98 and charges the DC link capacitor(s) 17. As configured, the gate drive pre-charge circuits 98 combine to generate a bias voltage across the DC link capacitor(s) 17 that is sufficient to provide enough magnetizing energy to the electric motor/generator unit 26 when the engine 12 is operating at idle for operation of the AC machine, and in one embodiment, can total at least 34V. Thus, the DC link capacitor(s) 17 is pre-charged to have sufficient electrical energy at a voltage that is greater than required to magnetize and otherwise operate the stator of the electric motor/generator unit 26, which in one embodiment is a voltage that is greater than a required operational voltage of 32V.

A control scheme 100 is provided that sustains auxiliary electrical power generation aboard the vehicle 10 when a high-voltage (HV) electrical fault condition is detected, such as when the high-voltage energy storage system 25 is disconnected or offline, whether due to an electrical fault, system installation issues, or otherwise. The high-voltage switch 40 is preferably automatically opened in response to such a fault to remove the high-voltage energy storage system 25 from the circuit, with the open high-voltage switch 40 providing a mechanism to diagnose that the high-voltage energy storage system 25 is disconnected. Depending on the on/off operating state of the engine 12 when such a fault occurs, a limp-home mode can be automatically executed in order to continue operating the vehicle 10. The particulars of the limp-home mode are selected depending on the operating state of the engine 12 at the time a high-voltage electrical fault is detected.

The control scheme 100 is executed in the control module 5 relying upon the gate drive pre-charge circuits 98 shown in FIG. 2. The control scheme 100 provides sustained electric power flow in the vehicle 10 upon detection or determination of a high-voltage electrical fault condition, e.g., when the high-voltage energy storage system 25 is offline, disconnected, or otherwise unavailable. This sustained electric power flow is achieved by pre-charging the DC link capacitor 17 to a minimum voltage and use it as a source of magnetizing energy to the stator of the electric motor/generator unit 26 to enable voltage build-up when it is spun by the engine 12. The control module is configured to operate in the presence of a high-voltage electrical fault condition associated with the high-voltage energy storage system 25 and related elements. As such, the control module 5 controls voltage across the positive and negative sides of the high-voltage DC power bus 31A and 31B via the bridge converter 27B, control of the auxiliary power module 28 in a buck mode for recharging the auxiliary battery 41, and controls the bridge converter 27B in a pre-charge mode to charge the DC link capacitor(s) 17 between the positive and negative sides of the high-voltage DC power bus 31A and 31B for use in exciting the stator of the electric motor/generator unit 26, permitting operating the electric motor/generator unit 26 in an electric power generating mode.

The control scheme 100 sustains operation of the electric motor/generator unit 26, using its low-voltage auxiliary power generation capability. The system uses isolated DC electric power available from the auxiliary battery 41 via the gate drive module 27A through the upper and lower gate drive bias power supplies 35A and 35B and the gate drive pre-charge circuits 98 to electrically charge the DC link capacitor(s) 17 to achieve a predetermined voltage across the positive and negative sides of the high-voltage DC power bus 31A and 31B sufficient to deliver magnetizing energy to the stator windings of the electric motor/generator unit 26. Once the electric motor/generator unit 26 is spinning and magnetized, it is controlled by the power inverter module 27 to sustain the high-voltage DC power bus 31 at its nominal set-point and enables the auxiliary power module 28 to supply electric power to support the low voltage loads, e.g., those associated with the auxiliary systems 45.

In operation, the control scheme 100 detects that the high-voltage energy storage system 25 is disconnected from the charging circuit, e.g., by detecting opening of the switch 40. The power output from the auxiliary power module 28 and transistor gate control signals output from the control module 5 to the power inverter module 27 are initially disabled. The gate drive power transferred to the upper and lower gate drive bias power supplies 35A and 35B, respectively, is provided via the gate drive pre-charge circuits 98 to charge the DC link capacitor(s) 17 to a predetermined voltage. Thus the gate drive circuits 98 pre-charge the DC link capacitor(s) 17, enabling magnetization of the electric motor/generator unit 26 via the bridge converter 27B. The magnetization of the electric motor/generator unit 26 enables it to operate in the electric power generating mode. The pre-charge time constant is a function of resistance of each of the resistors 96, the DC link capacitor 17 and the quantity of phases of the electric motor/generator unit 26. A pair of the gate drive pre-charge circuits 98A and 98B associated with a single phase of the electric motor/generator unit 26 is shown.

When a high-voltage electrical fault condition occurs with the engine 12 in the engine-on state and the electric motor/generator unit 26 operating as an electric power generator, a limp-home mode is executed. During operation in the limp-home mode, the engine 12 supplies mechanical power to the electric motor/generator unit 26, allowing the electric motor/generator unit 26 to operate in its capacity as a generator. Electrical power is thus generated by the electric motor/generator unit 26 and supplied to the bridge converter 27B, and after inversion, to the auxiliary power module 28 as DC power. With the engine 12 propelling the vehicle 10, power flow is provided to the auxiliary battery 41, which allows the auxiliary systems 45 described with reference to FIG. 1 to remain energized.

When a high-voltage electrical fault condition occurs with the engine 12 in the engine-off state during ongoing vehicle operation subsequent to executing the Auto-Stop control scheme, or when the electric motor/generator unit 26 is not generating power, the control module 5 can activate the starter motor 11 to crank the engine 12 via the auxiliary battery 41 to start the engine 12 in response to a command to control the engine 12 to the engine-on state in response to the commanded Auto-Start control scheme.

After the engine 12 is in the engine-on state, the control module 5 signals the gate drive module 27A to transfer electrical current from the auxiliary battery 41 through the gate drive module 27A to the gate drive pre-charge circuits 98 to charge the DC link capacitor(s) 17 to a predetermined voltage. The charged DC link capacitor(s) 17 provides magnetizing current to the stator of the electric motor/generator unit 26 originating from the auxiliary battery 41 to operate the electric motor/generator unit 26 in an asynchronous mode. The engine 12 provides the necessary torque for rotating the rotor of the electric motor/generator unit 26.

In a Voltage Regulating Mode, the power inverter module 27 controls the electric motor/generator unit 26 so that the electric motor/generator unit 26 operates in its capacity as an electric power generator, with a DC voltage that is greater than the voltage provided by the pre-charge circuits 98. The power inverter module 27 provides magnetizing current to the stator using the DC link capacitor(s) 17, and helps sustain the charge on the DC link capacitor(s) 17 using torque from the electric motor/generator unit 26. In the Voltage Regulating Mode, once the voltage of the DC link capacitor(s) 17 exceeds the pre-charge voltage, e.g., approximately 32V or more in one exemplary embodiment, the diodes 97 in the pre-charge circuit 98 are reverse-biased and stop providing power to the DC link capacitor(s) 17.

When the electric motor/generator unit 26 operates as an electric power generator, including sustaining the electrical charge on the DC link capacitor(s) 17. The auxiliary power module 28 can be enabled to electrically charge the auxiliary battery 41.

During each of the aforementioned modes, the speed of the engine 12 can be limited to less than a predetermined level, e.g., approximately 4000 RPM or less in one exemplary embodiment, in order to control the voltage levels across the positive and negative sides of the high-voltage DC power bus 31A and 31B.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An electric circuit for a hybrid powertrain system, comprising:
    a multiphase bridge inverter electrically connected to a high-voltage battery via positive and negative sides of a high-voltage DC power bus;
    a multiphase asynchronous AC machine electrically connected to the multiphase bridge inverter;
    a high-voltage DC link capacitor electrically connected between the positive and negative sides of the high-voltage DC power bus;
    a low-voltage battery electrically connected to upper and lower gate drive bias power supplies; and
    a plurality of gate drive pre-charge circuits, each electrically connected between one of the gate drive bias power supplies and the multiphase bridge inverter;
    wherein the low-voltage battery electrically charges the high-voltage DC link capacitor via the upper and lower gate drive bias power supplies and the gate drive pre-charge circuits when a high-voltage switch disconnects the high-voltage battery from the high-voltage DC power bus.

2. The electric circuit for the hybrid powertrain system of claim 1, wherein the low-voltage battery electrically charges the high-voltage DC link capacitor to a voltage level sufficient to operationally magnetize a stator of the multiphase asynchronous AC machine.

3. The electric circuit for the hybrid powertrain system of claim 1, wherein the low-voltage auxiliary battery electrically charges the high-voltage DC link capacitor to a predetermined voltage level when the high-voltage battery is disconnected from the high-voltage DC power bus by operation of the high-voltage switch.

4. The electric circuit for the hybrid powertrain system of claim 1, wherein each of the upper and lower gate drive bias power supplies provides DC electric power to a gate drive circuit for activation of a respective power transistor of the multiphase bridge inverter.

5. The electric circuit for the hybrid powertrain system of claim 4, wherein one of the respective power transistors of the multiphase bridge inverter is connected between the positive side of the high-voltage DC power bus and one phase of the AC machine, and wherein one of the gate drive pre-charge circuits is connected between a high-voltage side of the upper gate drive bias power supply and the positive side of the high-voltage DC power bus.

6. The electric circuit for the hybrid powertrain system of claim 4, wherein one of the respective power transistors of the multiphase bridge inverter is connected between the negative side of the high-voltage DC power bus and one phase of the AC machine, and wherein one of the gate drive pre-charge circuits is connected between a high-voltage side of the lower gate drive bias power supply and the one phase of the AC machine.

7. The electric circuit for the hybrid powertrain system of claim 4, further comprising a control module controlling the gate drive circuit.

8. The electric circuit for the hybrid powertrain system of claim 1, wherein each gate drive pre-charge circuit comprises a respective diode connected in series with a respective resistive device, each respective diode arranged to permit electric current flow from one of the upper and lower gate drive bias power supplies to the multiphase bridge inverter and restrict electric current flow from the multiphase bridge inverter to the one of the upper and lower gate drive bias power supplies.

9. An electric circuit for a hybrid powertrain system, comprising:
    a multiphase bridge inverter electrically connected to a high-voltage battery via positive and negative sides of a high-voltage DC power bus;
    a multiphase asynchronous AC machine electrically connected to the multiphase bridge inverter;
    a high-voltage switch when closed electrically connects the high-voltage battery to the high-voltage DC power bus and when opened electrically disconnects the high-voltage battery from the high-voltage DC power bus;
    a high-voltage DC link capacitor electrically connected between positive and negative sides of the high-voltage DC power bus;
    a low-voltage auxiliary battery electrically connected to upper and lower gate drive bias power supplies providing DC electric power to a plurality of gate drive circuits, the gate drive circuits activating power transistors of the multiphase bridge inverter; and
    a plurality of gate drive pre-charge circuits, each electrically connected between a respective one of the upper and lower gate drive bias power supplies and the multiphase bridge inverter;
    wherein the low-voltage auxiliary battery electrically charges the high-voltage DC link capacitor to a preferred voltage level via the upper and lower gate drive bias power supplies and the gate drive pre-charge circuits when the high-voltage switch is opened.

10. The electric circuit for the hybrid powertrain system of claim 9, wherein each of the gate drive pre-charge circuits comprises a respective diode connected in series with a respective resistive device, each respective diode arranged to permit electric current flow from the respective one of the upper and lower gate drive bias power supplies to the multiphase bridge inverter and restrict electric current flow from the multiphase bridge inverter to the respective one of the upper and lower gate drive bias power supplies.

11. The electric circuit for the hybrid powertrain system of claim 9, wherein one of the gate drive pre-charge circuits is connected between a high-voltage side of one of the upper gate drive bias power supplies and the positive side of the high-voltage DC power bus.

12. The electric circuit for the hybrid powertrain system of claim 9, wherein one of the gate drive pre-charge circuits is connected between a high-voltage side of one of the lower gate drive bias power supplies and a node connecting a pair of switch devices of the multiphase bridge inverter.

13. The electric circuit for the hybrid powertrain system of claim 9, wherein the preferred voltage level comprises a voltage sufficient to operate the multiphase asynchronous AC machine.

14. The electric circuit for the hybrid powertrain system of claim 9, wherein the low-voltage auxiliary battery is configured to electrically charge the high-voltage DC link capacitor to a preferred voltage level via the upper and lower gate drive bias power supplies and the gate drive pre-charge circuits when the high-voltage battery is disconnected from the high-voltage DC power bus by operation of the high-voltage switch.

15. The electric circuit for the hybrid powertrain system of claim 9, further comprising a control module configured to control operation of the plurality of gate drive circuits and the high-voltage switch.

16. Method for operating a hybrid powertrain system comprising an internal combustion engine mechanically coupled to an electric motor/generator unit, the electric motor/generator unit electrically connected to a bridge inverter including a high-voltage DC power bus having a positive high-voltage DC bus and a negative high-voltage DC bus, a high-voltage battery selectively connectable to the high-voltage DC power bus via a high-voltage switch, and upper and lower gate drive bias power supplies providing DC electric power from a low-voltage battery to a plurality of gate drive precharge circuits, the method comprising:
  when the high-voltage battery is disconnected from the high-voltage DC bus via the high-voltage switch,
   employing the low-voltage battery to electrically charge a capacitor between the positive high-voltage DC bus and the negative high-voltage DC bus with the upper and lower gate drive bias power supplies to establish an operational voltage of the motor/generator unit across the high-voltage DC bus; and
  spinning and operating the electric motor/generator unit in an electric power generating mode.

17. The method of claim 16, wherein spinning the electric motor/generator unit comprises electrically connecting an engine starter motor to the low-voltage battery to transfer electric power thereto to start the engine from an engine-off state.

* * * * *